US012580115B2

(12) United States Patent
Hou et al.

(10) Patent No.: US 12,580,115 B2
(45) Date of Patent: Mar. 17, 2026

(54) LAMINATE TRANSFORMER WITH OVERLAPPING LEAD FRAME

(71) Applicant: Texas Instruments Incorporated, Dallas, TX (US)

(72) Inventors: Dongbin Hou, Plano, TX (US); Zhemin Zhang, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 900 days.

(21) Appl. No.: 17/363,115

(22) Filed: Jun. 30, 2021

(65) Prior Publication Data

US 2023/0005652 A1 Jan. 5, 2023

(51) Int. Cl.

*H01F 27/29* (2006.01)
*H01F 27/06* (2006.01)
*H01F 27/24* (2006.01)
*H01F 27/28* (2006.01)

(52) U.S. Cl.

CPC ............ *H01F 27/06* (2013.01); *H01F 27/24* (2013.01); *H01F 27/2804* (2013.01); *H01F 2027/2809* (2013.01)

(58) Field of Classification Search

CPC ...... H01F 27/06; H01F 27/24; H01F 27/2804; H01F 2027/2809; H01F 27/022; H01F 27/22; H01F 27/292; H01F 2027/2819; H01F 27/2876; H01F 27/266; H01F 27/2828; H01F 27/306; H01F 2027/065

See application file for complete search history.

(56) References Cited

U.S. PATENT DOCUMENTS 5,428,245 A * 6/1995 Lin ....................... H01L 23/495 257/676
2008/0180206 A1* 7/2008 Fouquet ................... H03H 7/52 336/200
2009/0134503 A1* 5/2009 Feng ................... H01F 17/0033 257/673
2009/0243783 A1* 10/2009 Fouquet .............. H01F 27/2804 336/200
2010/0020448 A1* 1/2010 Ng ...................... H03F 3/45192 336/200
2010/0259909 A1* 10/2010 Ho ........................... H03H 7/52 361/767

(Continued)

OTHER PUBLICATIONS

"UCC12050 High-Efficiency, Low-EMI, 5-kVrms Reinforced Isolation DC-DC Converter", UCC1250, SNVSB38C, Texas Instruments Incorporated, Sep. 2019, Revised 2020, pp. 1-34.

(Continued)

*Primary Examiner* — Mang Tin Bik Lian

(74) *Attorney, Agent, or Firm* — Zhenhai Fu; Frank D. Cimino

(57) ABSTRACT

An apparatus has a laminate substrate that has a first surface and an opposite second surface. A laminate transformer is located within the laminate substrate between the first surface and the second surface. The transformer has a first coil adjacent the first surface and a second coil adjacent the second surface. A magnetic core element on the first surface overlaps a portion of the first coil. A lead frame on the first surface is spaced apart from the magnetic core element. A portion of the lead frame overlaps a portion of the first coil to provide a thermal conductive path.

20 Claims, 9 Drawing Sheets

(56) References Cited

U.S. PATENT DOCUMENTS

| | | | | |
|---|---|---|---|---|
| 2011/0095620 | A1* | 4/2011 | Fouquet | H03F 3/45475 336/200 |
| 2011/0260825 | A1* | 10/2011 | Doljack | H01F 17/04 29/606 |
| 2012/0168901 | A1* | 7/2012 | Santangelo | H01L 23/5227 438/107 |
| 2015/0069572 | A1* | 3/2015 | Khanolkar | H10D 1/20 257/531 |
| 2017/0178787 | A1* | 6/2017 | Massolini | H01F 27/288 |
| 2017/0194088 | A1* | 7/2017 | Massolini | H01F 27/2804 |
| 2017/0256507 | A1* | 9/2017 | Choe | H01P 5/187 |
| 2017/0353056 | A1* | 12/2017 | Kawai | H01P 5/18 |
| 2018/0190628 | A1* | 7/2018 | Male | H10F 30/245 |
| 2020/0211754 | A1 | 7/2020 | Zhang et al. | |
| 2020/0211939 | A1* | 7/2020 | Khanolkar | H01L 23/3107 |
| 2020/0258819 | A1* | 8/2020 | Ko | H01L 24/33 |

OTHER PUBLICATIONS

Ryan Manack, "Power Through the Isolation Barrier: The Landscape of Isolated DC/DC Bias Power Supplies", Texas Instruments Incorporated, Jan. 2020, pp. 1-7.

* cited by examiner

LAMINATE TRANSFORMER WITH OVERLAPPING LEAD FRAME

TECHNICAL FIELD

This relates to a laminate transformer with an overlapping lead frame.

BACKGROUND

Moving signals and power across an isolation barrier is a common challenge for designers. Isolation might be required for safety, noise immunity or large potential differences between system domains. For example, a cellphone charger is internally isolated to prevent humans from becoming electrically tied to the mains if the connector short-circuits. In other applications like factory robots, sensitive control circuitry sits on a separate ground and is isolated from the motors that draw large DC currents that create noise and ground bounces. Similarly, in electric drive automotive applications, sensitive control circuitry sits on a separate ground and is isolated from the drive motor(s) that draw large DC currents that create noise and ground bounces

SUMMARY

In described examples, an apparatus has a laminate substrate that has a first surface and an opposite second surface. A laminate transformer is located within the substrate between the first surface and the second surface. The transformer has a first coil adjacent the first surface and a second coil adjacent the second surface. A magnetic core element on the first surface overlaps a portion of the first coil. A lead frame on the first surface is spaced apart from the magnetic core element. A portion of the lead frame overlaps a portion of the first coil to provide a thermal conductive path.

DETAILED DESCRIPTION

Figure 1A:
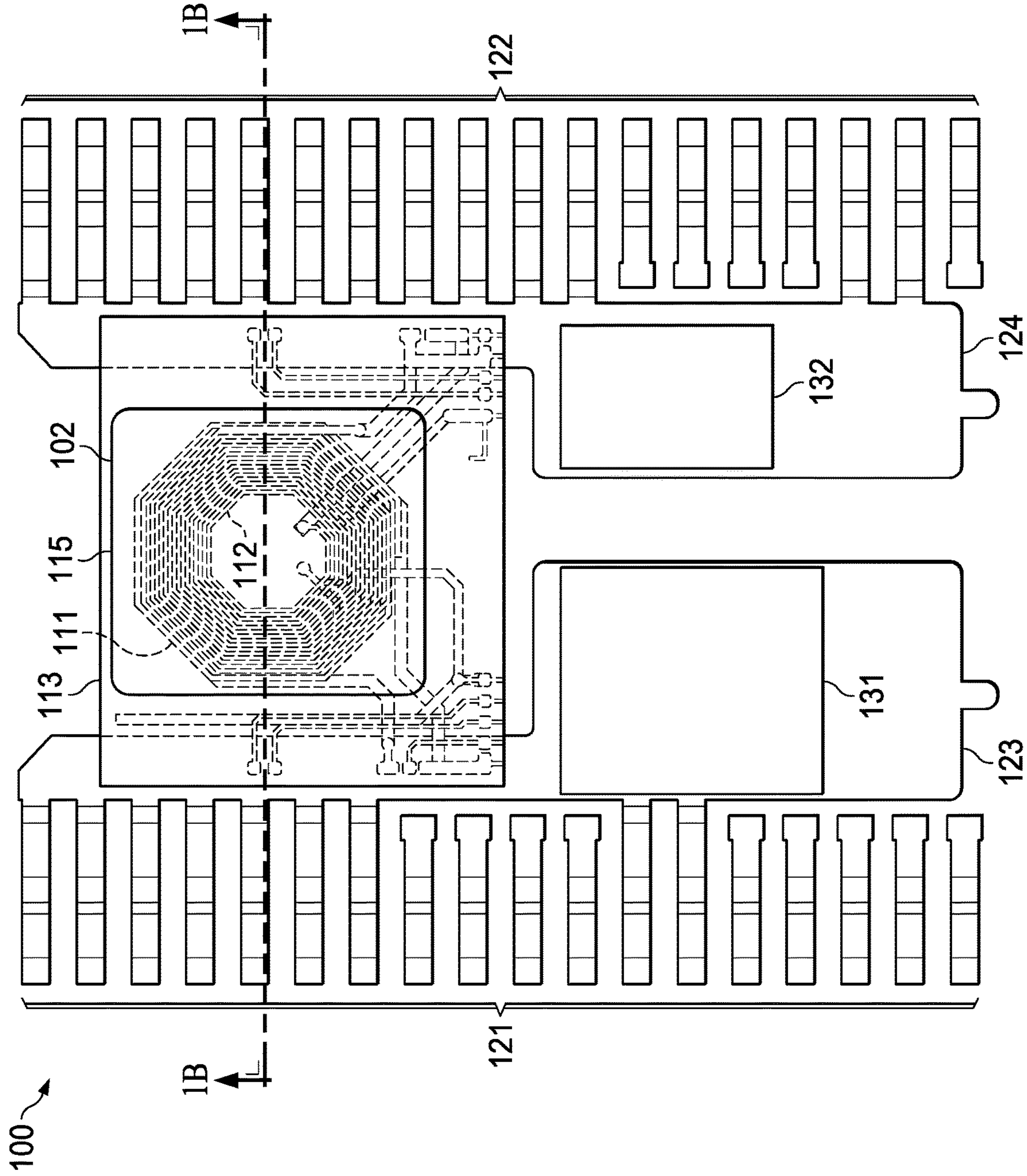
FIG. 1A is a bottom view and FIG. 1B is a cross-sectional view of an isolation device that includes a laminate transformer.

In the drawings, like elements are denoted by like reference numerals for consistency.

Galvanic isolation is a principle of isolating functional sections of electrical systems to prevent current flow from one section to another. To prevent current flow, no direct conduction path is permitted. Energy or information can still be exchanged between the sections by other means, such as capacitance, induction, or electromagnetic waves, or by optical, acoustic, or mechanical means.

Galvanic isolation may be used where two or more electric circuits must communicate, but their grounds may be at different potentials. It is an effective method of breaking ground loops by preventing unwanted current from flowing between two units sharing a ground conductor. Galvanic isolation is also used for safety, preventing accidental current from reaching ground through a person's body.

The general operation of laminate transformer galvanic isolation devices is known; see, for example, "UCC12050 High-Efficiency, Low-EMI, 5-kVRMS Reinforced Isolation DC-DC Converter," SNVSB38C, September 2019, revised April 2020, which is incorporated by reference herein.

In an example, an integrated laminate transformer galvanic isolator allows information to be transmitted between nodes of a system at different voltage levels using a high voltage (HV) inductive barrier along with inverter and rectifier circuitry on opposite sides of that barrier. The HV inductive device is implemented as two coils that are each formed on one or more laminate layers of the isolation device. As will be described in more detail hereinbelow, a portion of a lead frame of the isolation device package overlaps a portion of the coils to provide a low thermal impedance for heat dissipation from the isolation device.

Figure 1B:
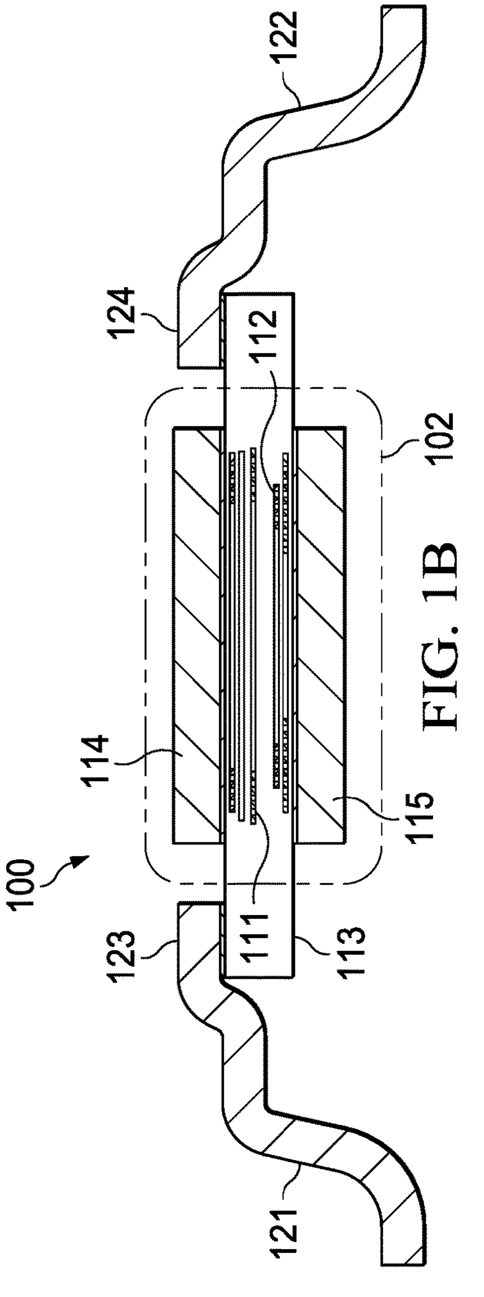

FIG. 1A is a bottom view and FIG. 1B is a cross-sectional view of a typical isolation device 100 that includes a laminate transformer 102. In this example, laminate transformer 102 includes a multilayer laminate substrate 113 that has a top surface and an opposite bottom surface. Secondary coil 111 and primary coil 112 are each located on one or more layers of multilayer substrate 113. Upper core element 114 is attached to the upper surface of substrate 113 and lower core element 115 attached to the lower surface of substrate 113. Core elements 114 and 115 are fabricated from a magnetic material to increase the inductance density and magnetic coupling between secondary coil 111 and primary coil 112. Upper core element 114 overlaps the entire extent of secondary coil 111, while lower core element overlaps the entire extent of primary coil 112. In this example, core elements 114, 115 and substrate 113 are illustrated in a semi-transparent manner to better illustrate the spatial relationship between these elements.

A lead frame is attached to transformer 102, typically using an adhesive material. In this example, left lead frame 121 has a portion 123 that overlaps and is adhered to substrate 113. Similarly, right lead frame 122 has a portion 124 that overlaps and is adhered to substrate 113.

In this example, rectifier circuitry 131 is attached to a die attach pad on left lead frame 121 and inverter circuitry 132 is attached to a die attach pad on right lead frame 122.

Figure 2:
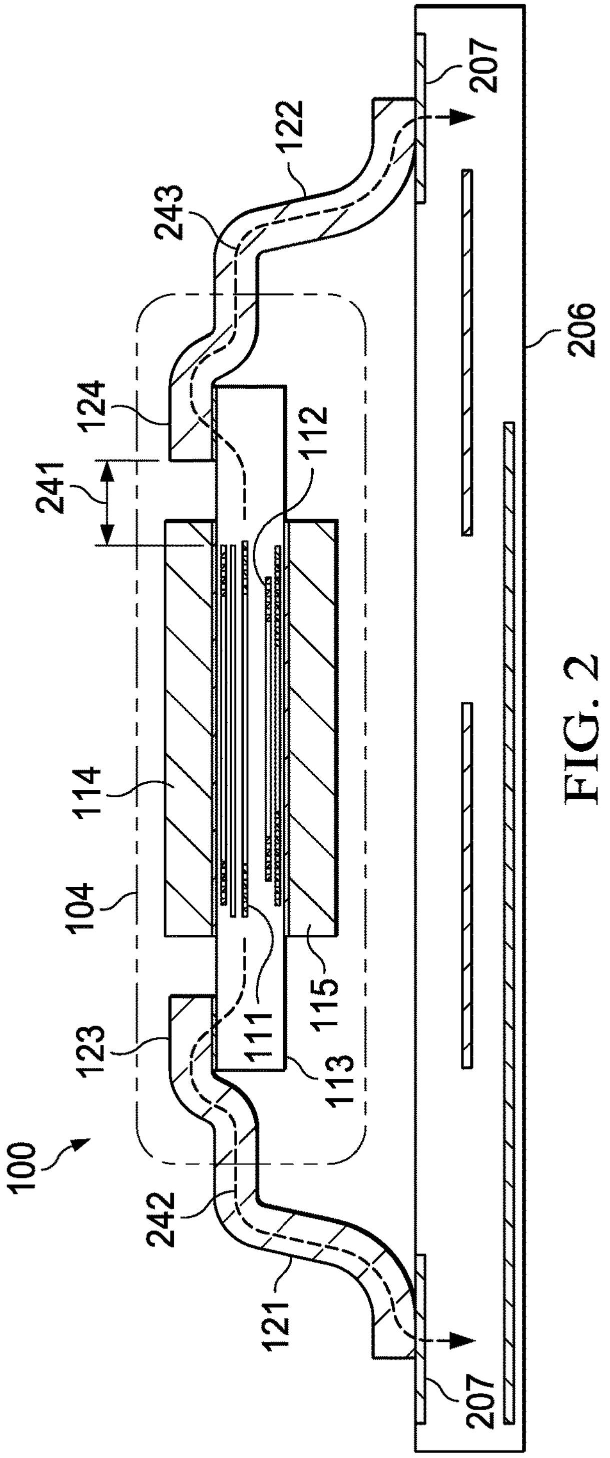
FIG. 2 is a cross-sectional view of the isolation device of FIG. 1B illustrating thermal conductivity within the device.

FIG. 2 is a cross-sectional view of the isolation device 100 of FIGS. 1A, 1B illustrating thermal conductivity within device 100. Isolation device 100 is encapsulated in a mold compound 104 using a known integrated packaging technique. In this example, isolation device 100 is mounted on a printed circuit board (PCB) 206 on which additional components and/or integrated circuits are mounted (not shown). PCB 206 includes metallic pads 207 onto which the leads of lead frame 121/122 are soldered using known soldering techniques. Various metallic signal lines and power planes within PCB 206 act as heat sinks for isolation device 100.

Heat is generated within coils 111, 112 due to resistive heating caused by the ohmic resistance (R) of the coils and the amount current (I) being conducted by the coils. This is often referred to as "$I^2R$ heating". Heat generated within the coils must be dissipated to keep the isolation device from overheating. Some heat is dissipated by infrared radiation away from device 100. Some heat may be dissipated by convection of the surrounding air around isolation device 100. However, most of the heat is dissipated by conduction from coils 111, 112 of transformer 102 through substrate 113 and then through lead frames 121, 122 to PCB 206, as illustrated by thermal conduction paths 242, 243. In this example, thermal conduction path 243 includes traveling through a length of substrate 113 indicated at 241.

A high thermal impedance exists within isolation device 100 because of the low thermal conductivity of materials in laminate substrate 113, die attach adhesive, magnetic material 114, 115 and mold compound 104.

Figure 3A:
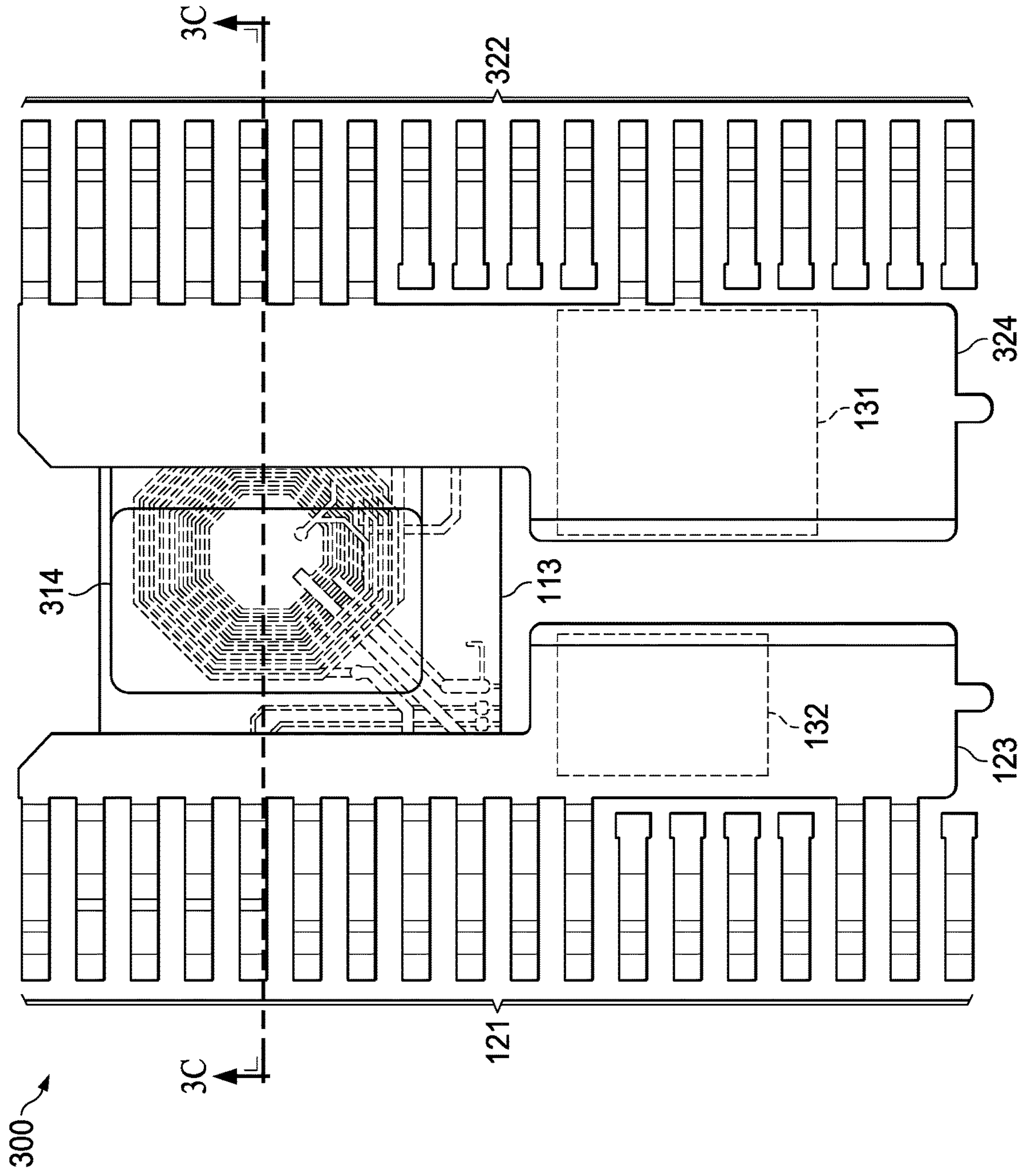
FIG. 3A is top view.
Figure 3B:
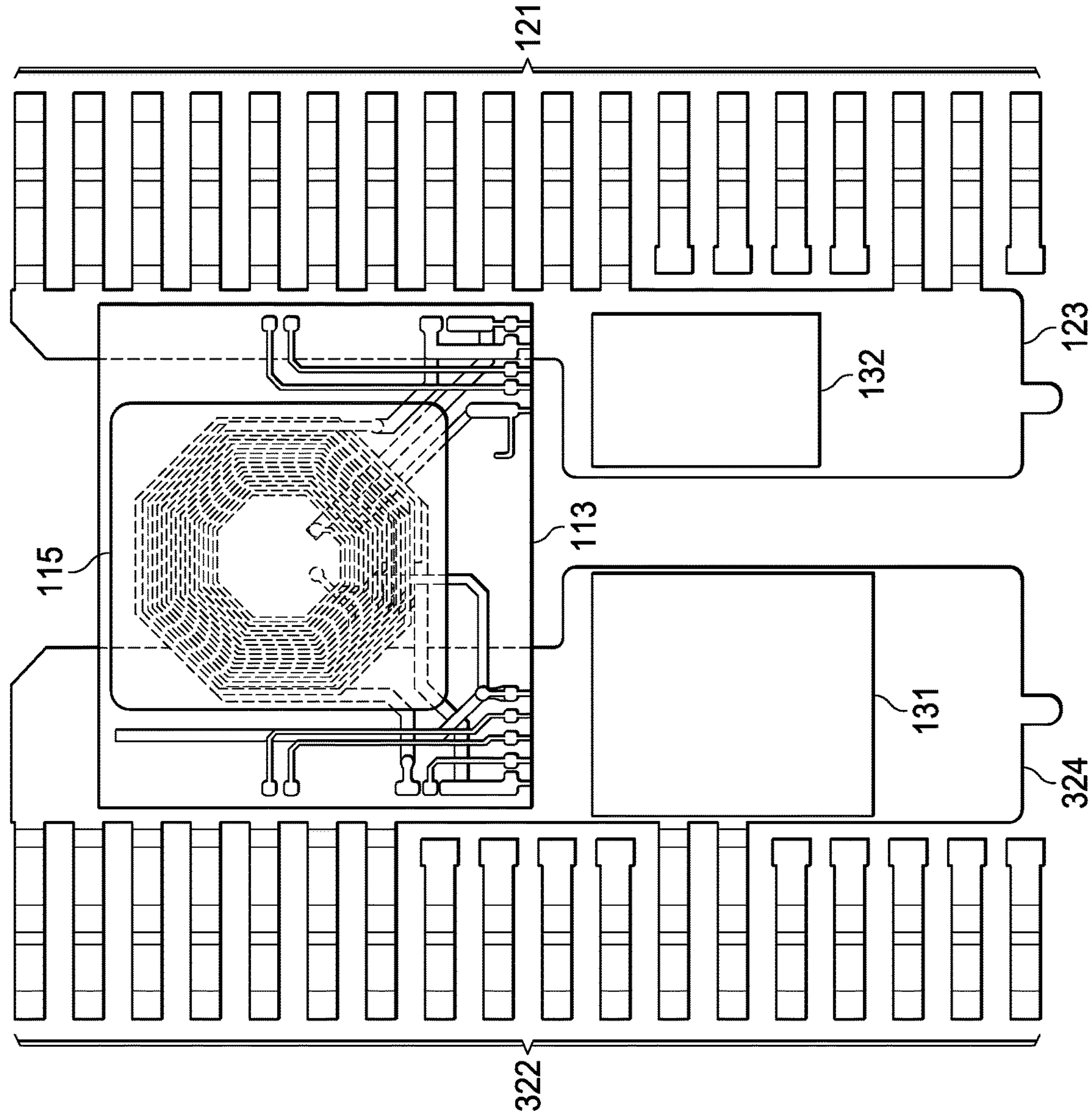
FIG. 3B is a bottom view and FIG. 3C is a cross-sectional view of an example isolation device in which a portion of the lead frame overlaps a portion of a coil of the laminate transformer.
Figure 3C:
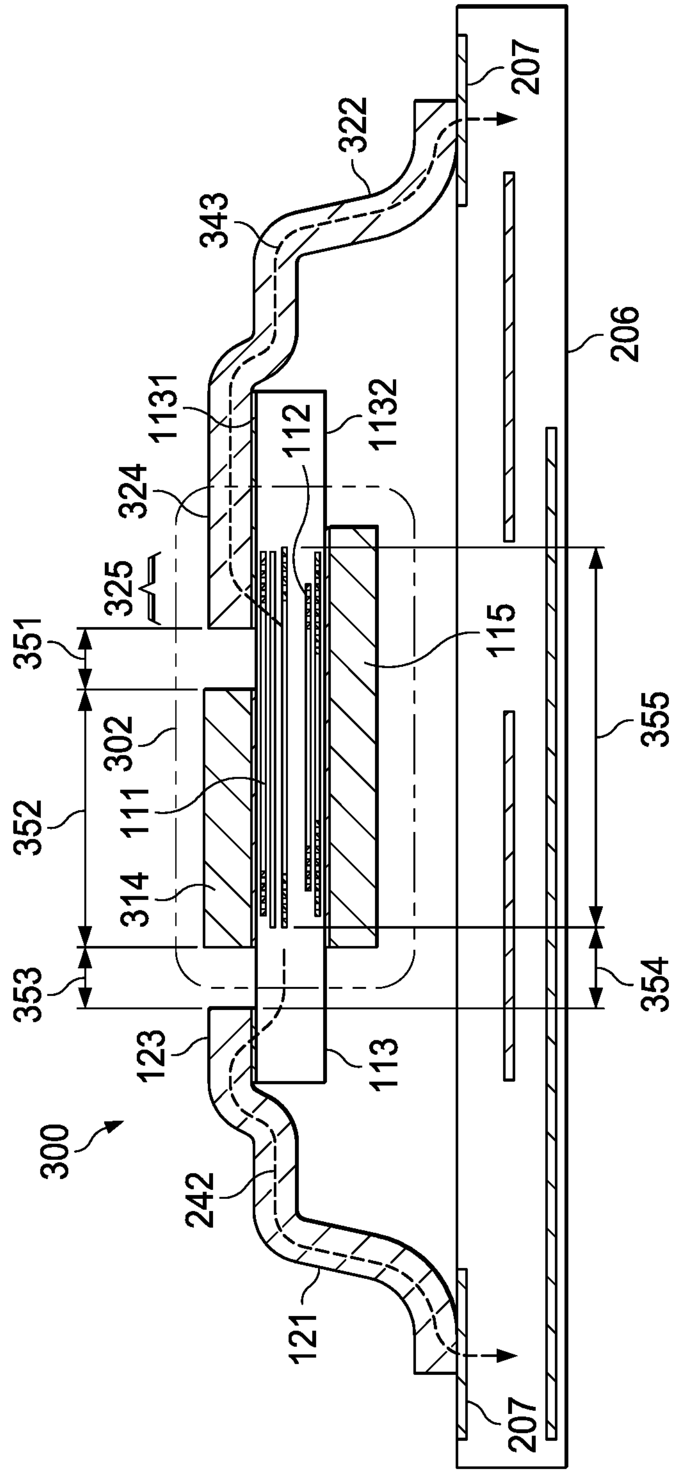

FIG. 3A is top view, FIG. 3B is a bottom view and FIG. 3C is a cross-sectional view of an example isolation device 300 and together will be referred to herein as FIG. 3. A portion 325 of the lead frame 324 overlaps a portion of a coil 111 of the laminate transformer 302. In this example, laminate transformer 302 includes a multilayer laminate substrate 113 that has a top surface 1131 and an opposite bottom surface 1132. Secondary coil 111 and primary coil 112 are each located on one or more laminate layers of multilayer laminate substrate 113.

In this example, the laminates are copper clad laminates and pre-pregs. Each pre-preg isolation layer has a thickness in the range of 30-70 um. This allows the copper that forms coils to be much thicker than the metal used in prior digital isolation devices that are formed on a silicon substrate. This allows larger current flows to be handled for power and signal applications. Transformer performance (quality factor, efficiency) may thereby be controlled by using copper thickness of 12 um-30 um and multiple metal layers to allow parallel inductor coils and lower coil resistance. In various examples, two to eight, or more metal layers may be used to form secondary coil 111 and primary coil 112.

In this example, secondary coil 111 is fabricated using three parallel conductive layers within multilayer laminate substrate 113. Primary coil 112 is fabricated using two parallel conductive layers within multilayer laminate substrate 113. Each conductive layer is patterned and etched to form conductive signal lines that are arranged in a spiral. Vias are fabricated to connect the separate layers to form a completed coil. The secondary coil 111 is adjacent the upper surface of substrate 113, while the primary coil is adjacent the lower surface of substrate 113. In this example, there is a thin laminate layer between secondary coil 111 and the upper surface of substrate 113 to electrically insulate secondary coil 111 from magnetic core element 314 and right lead frame portion 324. Similarly, there is a thin laminate layer between primary coil 112 and the lower surface of substrate 113 to electrically insulate primary coil 112 from magnetic core element 115. Thus, as used herein, the term "adjacent" means the coils located near the surface are spaced apart from the surface by one or more laminate, pre-preg, or solder mask layers.

In this example, the coils are fabricated as octagon spirals, but in other examples they may be fabricated in other shapes, such as circular, hexagonal, etc. Fabrication of various examples of a multilayer laminate substrate is described in more detail in U.S. Patent Publication 2020-0211754, "Galvanic Isolation of Integrated Closed Magnetic Path Transformer with BT Laminate," filed Dec. 30, 2018 which is incorporated by reference herein.

Upper core element 314 is attached to the upper surface of substrate 113 and lower core element 115 attached to the lower surface of substrate 113. Core elements 314 and 115 are fabricated from a magnetic material to increase the inductance density and magnetic coupling between secondary coil 111 and primary coil 112. Upper core element 314 overlaps only a fractional portion of secondary coil 111, while lower core element overlaps the entire extent of primary coil 112. In this example, core elements 314, 115 and substrate 113 are illustrated in a semi-transparent manner to illustrate the spatial relationship between these elements. In this example, the terms "upper," "lower," "left," and "right" merely refer to the orientation shown in FIG. 3C and are not intended to connote any further limitation.

A lead frame is attached to transformer 302 using an adhesive material. In this example, left lead frame 121 has a portion 123 that overlaps substrate 113. Similarly, right lead frame 322 has a portion 324 that overlaps substrate 113. In this example, rectifier circuitry 131 is fabricated as a separate integrated circuit (IC) die and is attached using an adhesive to a die attach pad on right lead frame 322. Inverter circuitry 132 is fabricated as a separate IC die and is attached using an adhesive to a die attach pad on left lead frame 121. In this example, each end of primary coil 112 and secondary coil 111 is coupled to bonding pads (not shown) via conductive silicon traces. Wire bonding is used to couple rectifier circuitry 131 to secondary coil 111 bond pads and to other leads of right lead frame 322. Similarly, wire bonding is used to couple inverter circuitry 132 to primary coil 112 bond pads and to other leads of left lead frame 121

Left lead frame 121 spaced apart from secondary coil 111 by an amount indicated at 354 to provide sufficient voltage isolation between left lead frame 121 and secondary coil 111. For example, if device 300 is rated to have a 5 kVRMS isolation capacity, then isolation space needs to be sufficient to prevent a voltage breakdown through laminate substrate 113 and the mold material that fills the space between left lead frame portion 123 and magnetic core element 314 when a 5 kVRMS potential difference exists. Since a high voltage will not be produced across right lead frame 322 and secondary coil 111, there does not need to be a high-voltage galvanic isolation distance between right lead frame 322 and secondary coil 111. However, in this example secondary coil 111 is insulated from lead frame 322. Substrate 113 has sufficient dielectric strength to provide high voltage isolation between right lead frame 322 and primary coil 112.

In this example, magnetic core elements 314 and 115 are made from a ferrite material. The ferrite material includes fine particles of ferromagnetic material that has a high permeability. The ferromagnetic particles are held together with a binding resin. In this example, the magnet core elements are cut from a sheet of ferrite material and attached to the respective top and bottom surface of substrate 113 using die attach adhesive by a pick and place machine during fabrication of device 300. Spacing 351 and 353 are selected to be sufficiently large to accommodate manufacturing tolerance of the pick and place and molding operation. In this example, spacing 351, 353 is approximately 0.5 mm. In another example, smaller or larger spacing may be needed depending on the fabrication process requirements.

Thermal conductivity is measured in watts per meter-kelvin (W/(m·K)). Heat transfer occurs at a lower rate in materials of low thermal conductivity than in materials of high thermal conductivity. For instance, metals typically have high thermal conductivity and are very efficient at conducting heat, while the opposite is true for insulating materials like laminate dielectric. Correspondingly, materials of high thermal conductivity are widely used in heat sink applications, and materials of low thermal conductivity are used as thermal insulation.

Table 1 illustrates the thermal conductivity of several materials used in device 300 (FIG. 3). For example, the thermal conductivity of the laminate material used in substrate 113 (FIG. 3C) is 0.6 W/mK compared to 260 W/mK for the lead frame 121, 322 (FIG. 3C) material, which is copper in this example. Referring again to FIG. 2, there is a thermal transfer bottleneck in the conduction path 243 (FIG. 2) traversing distance 241 (FIG. 2) through substrate 113 (FIG. 2)

TABLE 1 thermal conductivity vs material

| Material | Thermal Conductivity (W/mK) |
|---|---|
| Silicon | 117 |
| Copper | 385 |
| Laminate dielectric | 0.6 |
| Laminate Attach | 0.64 |
| Die Attach (25 u) | 0.64 |
| Magnetics Attach (25 u) | 0.64 |
| Magnetics | 4 |
| Solder | 60 |
| Lead frame | 260 |
| Mold compound | 0.88 |

Referring still to FIGS. 3A, 3B, 3C, in this example, a portion of lead frame 324 also overlaps a portion of secondary coil 111, as indicated at 325. In this case, since a portion 325 of lead frame 324 overlaps a portion of secondary coil 111, a thermal conductive path illustrated as 343 is established that allows conduction of heat from secondary coil 111 directly into lead frame 324 without needing to travel through a length of substrate 113 as indicated at 241 (FIG. 2).

In this example, the size of magnetic core element 314 is reduced in order to provide space for the extended portion 324 of lead frame 322 that overlaps coil 111. Therefore, magnetic core element 314 does not completely overlap coil 111, which causes some reduction in the performance of transformer 302.

Figure 4A:
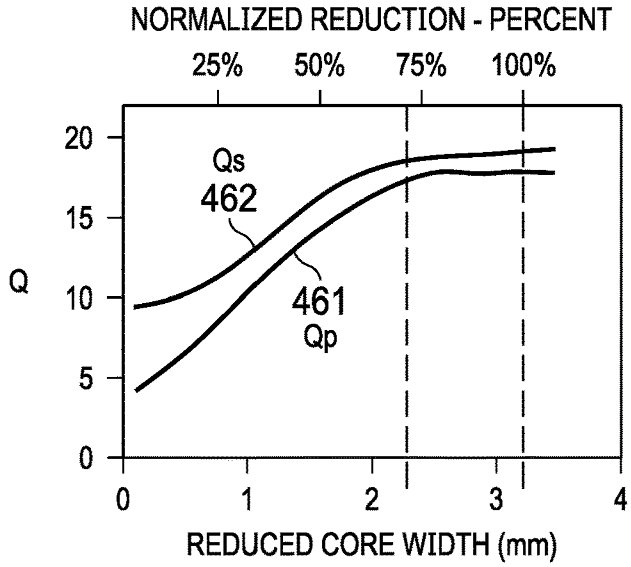
FIGS. 4A, 4B, and 4C are plots illustrating performance of the isolation device of FIG. 3C vs width of a magnetic core element.
Figure 4B:
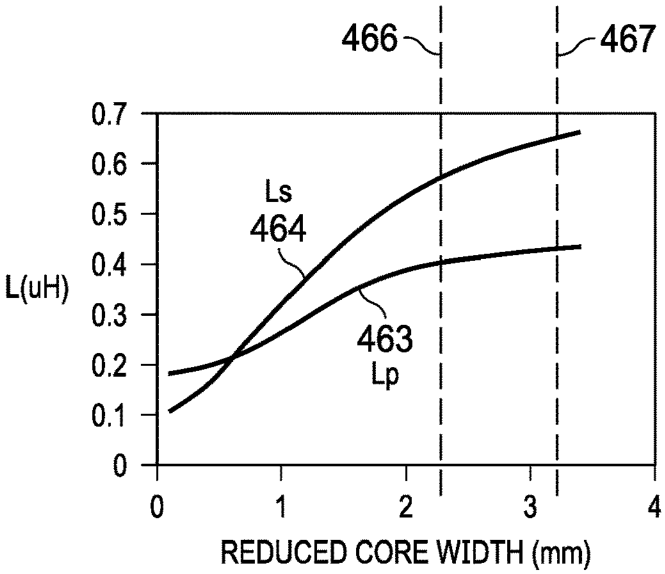
Figure 4C:
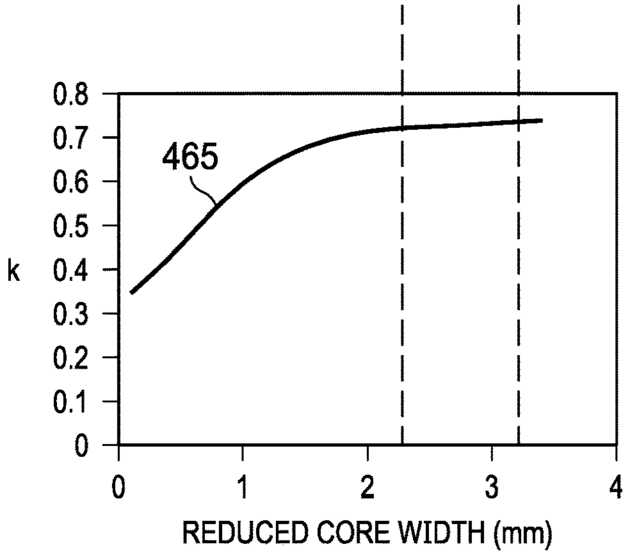

FIGS. 4A, 4B, and 4C are plots illustrating performance of isolation device of 300 FIG. 3 vs width 352 (FIG. 3C) of magnetic core element 314 (FIG. 3C) operating at 16 MHz. FIG. 4A is a plot of quality factor (Q) vs the reduced core width of magnetic core element 314. Plot 461 represents primary coil 112 and plot 462 represent secondary coil 111. In this example, the width 355 (FIG. 3C) of secondary coil 111 is approximately 3.1 mm as indicated by dotted line 467. The overall height of transformer 302 from the bottom of core element 115 to the top of core element 314 is approximately 1 mm. In other examples, the width may be in a range of approximately 3-5 mm. Other dimensions outside these exemplary ranges may alternatively be employed depending on the transformer design and packaging constraints.

FIG. 4B is a plot of inductance (L) vs the reduced core width of magnetic core element 314. Plot 463 represents primary coil 112 and plot 464 represent secondary coil 111. FIG. 4C is a plot of coupling factor (k) vs the reduced core width of magnetic core element 314.

As shown in FIGS. 4A, 4B, and 4C, reducing the width of the magnetic core element does cause some reduction in Q, L, and k; however, a reasonable operating point exists around a knee in the plots indicated by dashed line 466. During a design process, a designer can make a tradeoff between a drop in transformer Q and efficiency vs an increase in thermal conductivity be selecting an appropriate width of the upper magnetic core element. In this example, a width of 2.2 mm is selected for the upper magnetic core element. Since the width of the secondary coil is approximately 3.1 mm, the width of the upper magnetic core is approximately 70% of the width of coil 111. In this example, lead frame 324 overlaps approximately 0.6 mm of the width of secondary coil 111, or about 20%. As illustrated in FIGS. 4A, 4B, 4C, the width of upper magnetic core can be reduced to approximately 50% of the width of secondary coil 111 without causing a serious degradation in performance. Thus, in this example, the width of right lead frame portion 324 may be selected to overlap as much as approximately 35% of the width of secondary coil 111 without causing a serious degradation in performance.

Reducing the width of the upper magnetic core element to allow room for the lead frame to overlap a portion of the secondary winding results in overall higher power delivery ability with a better trade-off between electrical and thermal performance. The transformer core size is reduced somewhat to provide better heat dissipation. Table 2 summarizes differences between device 100 (FIG. 2) and device 300 (FIG. 3). In this example, transformer 302 (FIG. 3C) with a lead frame that overlaps the secondary coil has improved thermal conductivity over transformer 102 (FIG. 2) that uses a non-overlap lead frame design. In Table 1, Rth-JA is junction-to-ambient thermal resistance; Psi-JB is junction-to-board thermal characterization parameter; and Psi-JT is junction to top of package thermal characterization parameter.

TABLE 2

| Lead frame design | Rth-JA (° C./W) | Psi-JB (° C./W) | Psi-JT (° C./W) |
|---|---|---|---|
| Non-overlap | 58.9 | 32.7 | 21.4 |
| overlap | 52.6 | 27.4 | 17.6 |
| Conductivity improvement | 12% | 19% | 22% |

Thus, using a lead frame that partially overlaps an associated coil of a laminate transformer has a small impact on transformer quality factor but provides a significant amount of improvement in thermal conductivity. There is small or negligible impact on the cost and no extra manufacturing step is required.

In this example, lead frame portion 324 overlaps approximately 20% of the width of secondary coil 111. However, in another example, even if the amount of overlap is minimal, such as 1%, a reduction in the thermal conduction path is still provided to improve cooling. In this example, with a minimal 1% overlap of secondary coil 111 by lead frame portion 324, magnetic core element 114 would overlap approximately 85% of secondary coil 111.

Figure 5A:
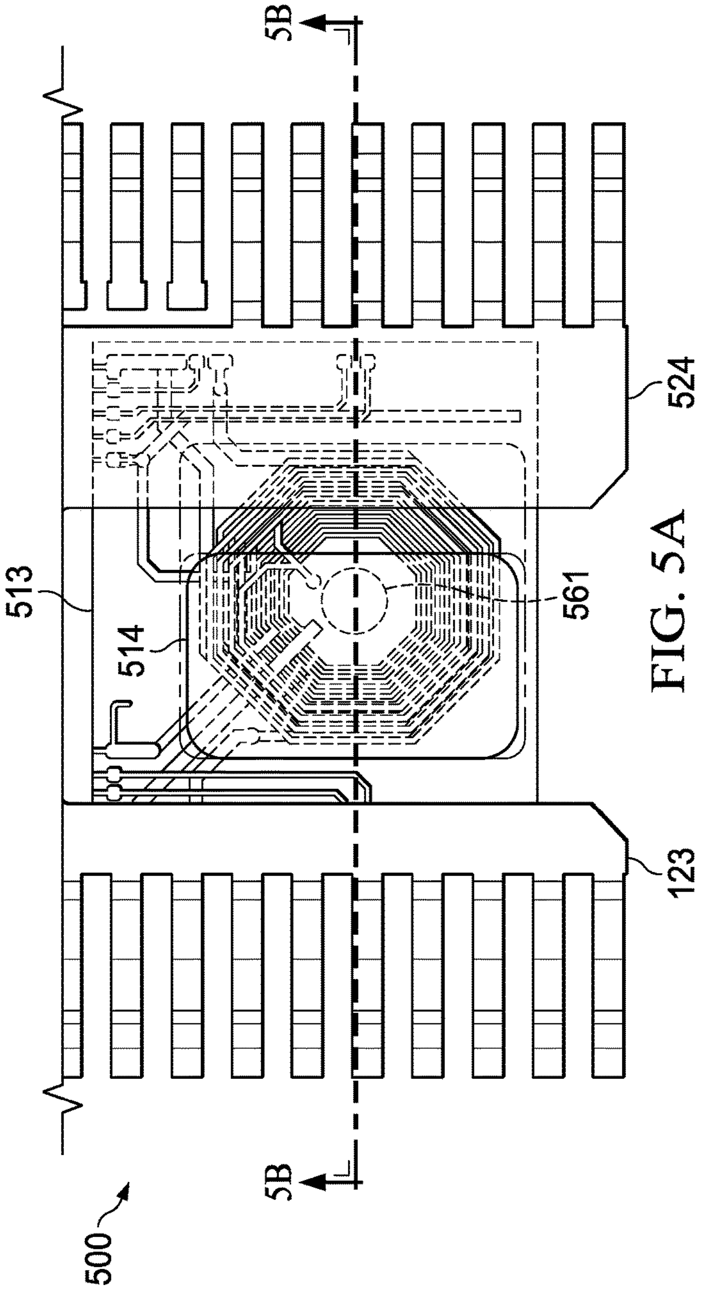
FIG. 5A is a top view and FIG. 5B is a cross-sectional view of another example isolation device that includes a laminate transformer in which a portion of the lead frame overlaps a portion of a coil of the laminate transformer.
Figure 5B:
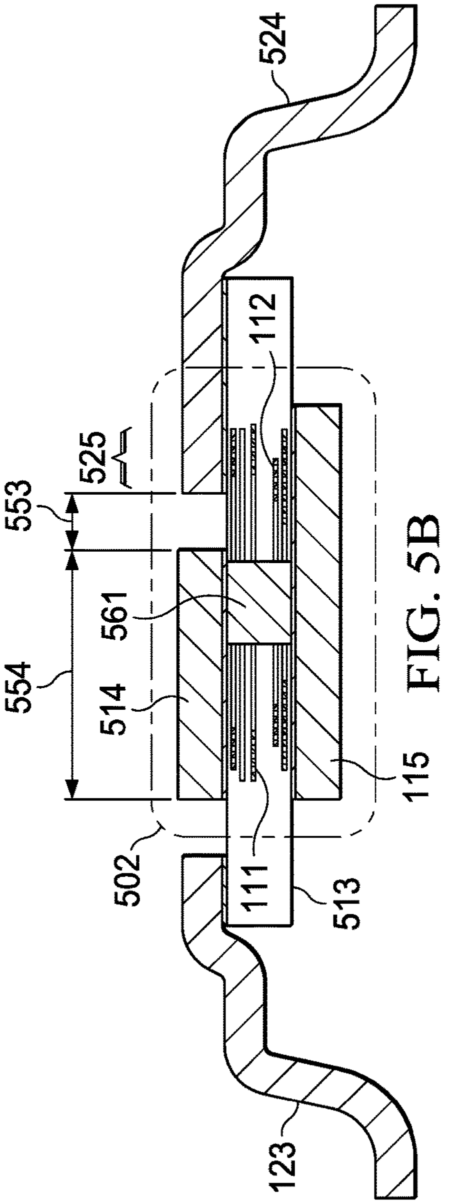

FIG. 5A is a top view and FIG. 5B is a cross-sectional view of another example isolation device that includes a laminate transformer 502 in which a portion of lead frame 524 overlaps a portion of a coil 111 of the laminate transformer. In this example, upper magnetic core element 514 and a portion of lead frame 524 are illustrated in a semi-transparent manner to better illustrate the spatial relationship of the upper core element 514 and the adjoining lead frame 524.

In this example, device 500 is similar to device 300 (FIG. 3), however, only the laminate transformer 502 portion is illustrated here. In this example, laminate transformer 502 includes a multilayer laminate substrate 513 that has a top surface and an opposite bottom surface. Secondary coil 111 and primary coil 112 are each located on one or more layers of multilayer laminate substrate 513.

Upper core element 514 is attached to the upper surface of substrate 513 and lower core element 115 attached to the lower surface of substrate 513. Core elements 514 and 115 are fabricated from a magnetic material to increase the inductance density and magnetic coupling between secondary coil 111 and primary coil 112. Upper core element 514 overlaps only a fractional portion of secondary coil 111, while lower core element 115 overlaps the entire extent of primary coil 112.

In this example, a portion of lead frame 524 overlaps a portion of secondary coil 111, as indicated at 525. In this case, since a portion 525 of lead frame 524 overlaps a portion of secondary coil 111, a thermal conductive path is established that allows conduction of heat from secondary coil 111 directly into lead frame 524 without needing to travel through a length of substrate 513.

In this example, an additional central magnetic core element 561 is added to increase the amount of magnetic flux that flows between the secondary coil 111 to primary coil 112. During fabrication, a hole is drilled through substrate 513 and central magnetic core element is inserted in the hole.

Figure 6A:
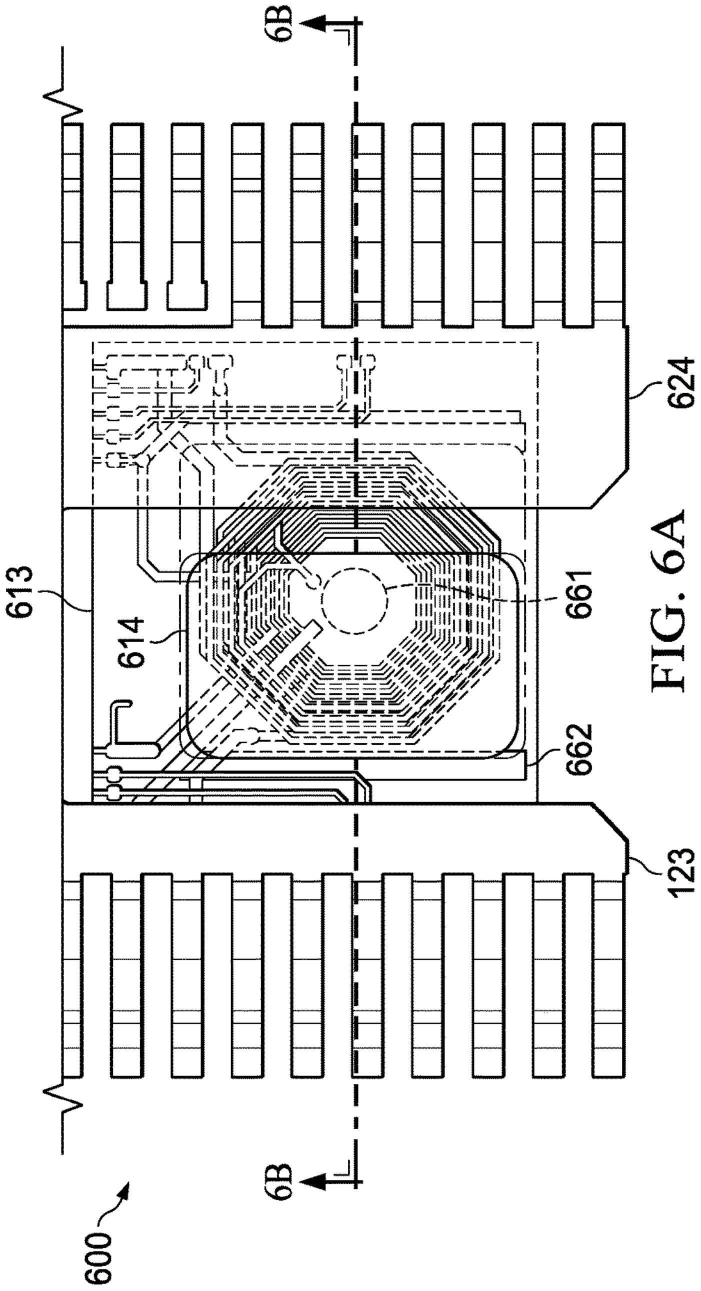
FIG. 6A is a top view and FIG. 6B is a cross-sectional view of another example isolation device that includes a laminate transformer in which a portion of the lead frame overlaps a portion of a coil of the laminate transformer.
Figure 6B:
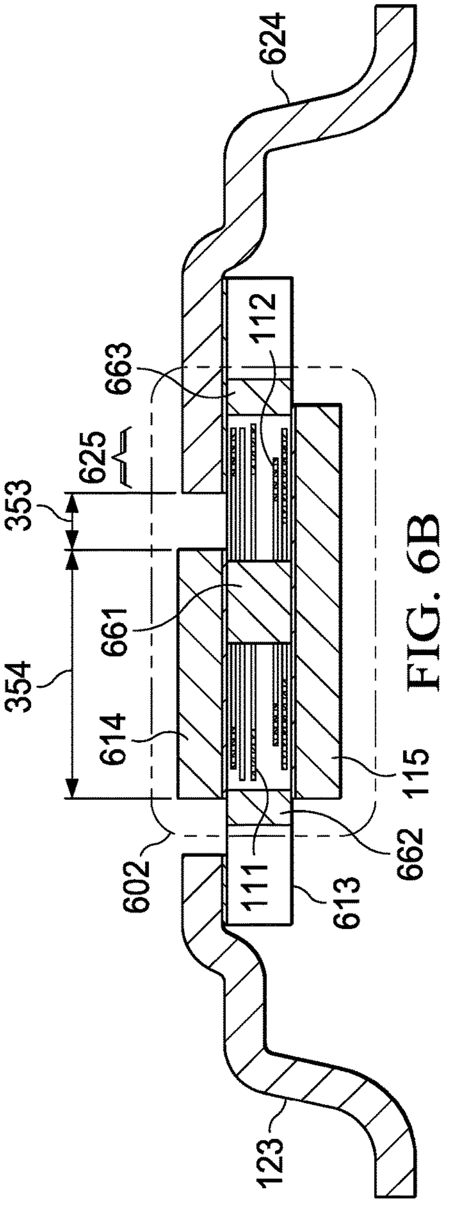

FIG. 6A is a top view and FIG. 6B is a cross-sectional view of another example isolation device that includes a laminate transformer 602 in which a portion of lead frame 624 overlaps a portion of a coil 111 of the laminate transformer. In this example, upper magnetic core element 614 and a portion of lead frame 624 are illustrated in a semi-transparent manner to better illustrate the spatial relationship of the upper core element 614 and the adjoining lead frame 624.

In this example, device 600 is similar to device 300 (FIG. 3), however, only the laminate transformer 602 portion is illustrated here. In this example, laminate transformer 602 includes a multilayer laminate substrate 613 that has a top surface and an opposite bottom surface. Secondary coil 111 and primary coil 112 are each located on one or more layers of multilayer substrate 613.

Upper core element 614 is attached to the upper surface of substrate 113 and lower core element 115 attached to the lower surface of substrate 613. Core elements 614 and 115 are fabricated from a magnetic material to increase the magnetic coupling between secondary coil 111 and primary coil 112. Upper core element 614 overlaps only a fractional portion of secondary coil 111, while lower core element overlaps the entire extent of primary coil 112.

In this example, a portion of lead frame 624 overlaps a portion of secondary coil 111, as indicated at 625. In this case, since a portion 625 of lead frame 624 overlaps a portion of secondary coil 111, a thermal conductive path is established that allows conduction of heat from secondary coil 111 directly into lead frame 624 without needing to travel through a length of substrate 613.

In this example, an additional central magnetic core element 661 and peripheral magnetic core elements 662, 663 are added to increase the amount of magnetic flux that flows between the secondary coil 111 to primary coil 112. In this example, central magnetic core element 661 is inserted into a hole drilled in substrate 613. Peripheral magnetic core elements 662, 663 are inserted in slots drilled or milled into substrate 613.

System Example

Figure 7:
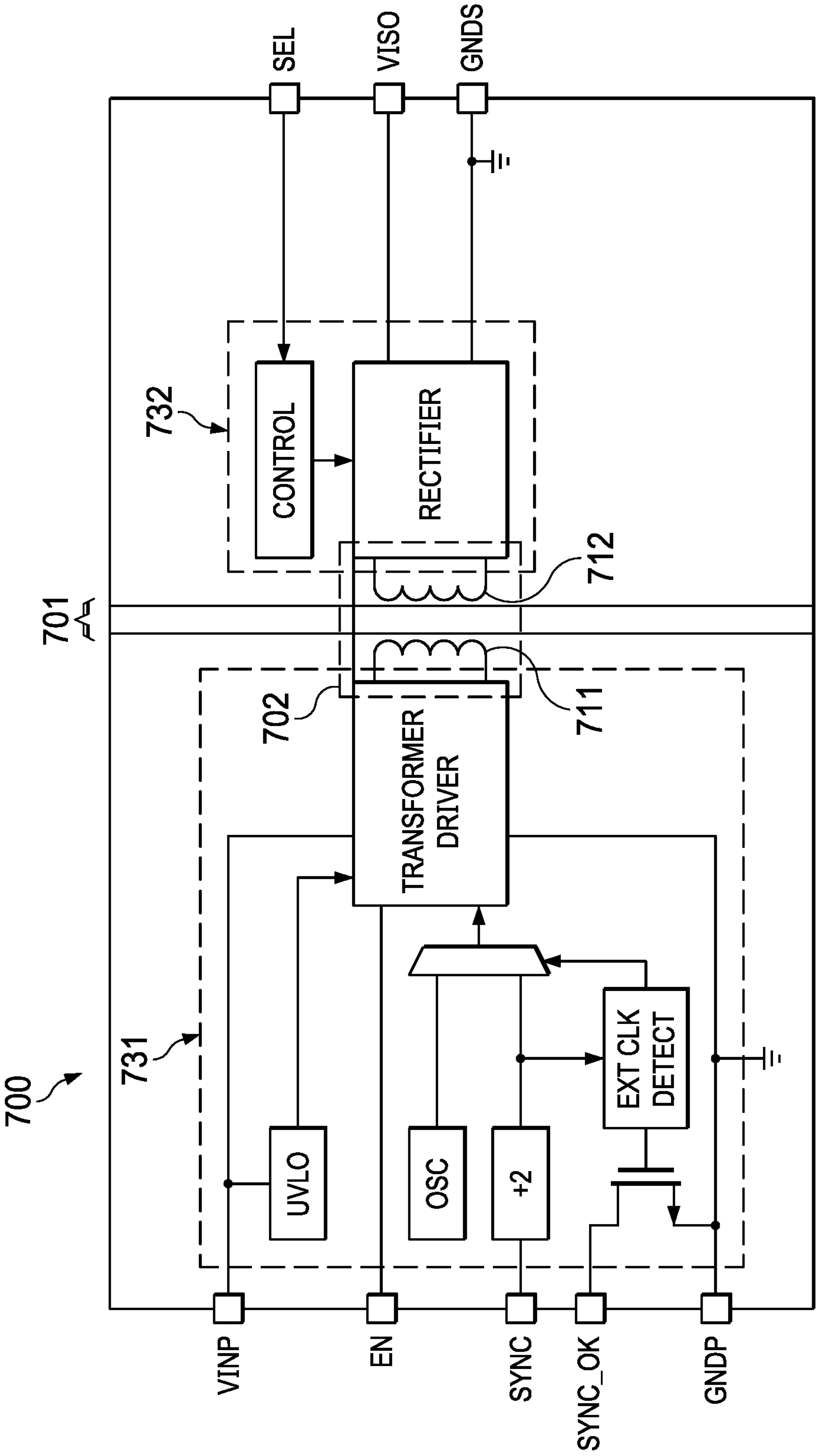
FIG. 7 is a block diagram of an example isolation device that includes a laminate transformer in which a portion of the lead frame overlaps a portion of a coil of the laminate transformer.

FIG. 7 is a block diagram of an example isolation device 700 that includes a laminate transformer 702 in which a portion of the lead frame overlaps a portion of a coil of the laminate transformer. Laminate transformer 702 is similar to any one of laminate transfers 302 (FIG. 3), 502 (FIG. 5B), 602 (FIG. 6B) described in more detail hereinabove. Boundary region 701 illustrates a galvanic isolation boundary that is provided by isolation device 700 using laminate transformer 702.

Circuitry 731 includes inverter switching circuitry and driver circuitry configured to invert a direct current (DC) voltage applied to terminal Vinp in a periodic manner so that a resultant oscillating voltage applied to primary coil 711 will induce a voltage in secondary coil 712. Circuitry 732 rectifies and filters the induced voltage to provide a DC output signal on output terminal Viso. In this manner, a DC input signal is transferred across a galvanic isolation barrier to form an output DC signal. In this example, the isolation barrier is rated to provide an isolation voltage protection of 5 kv. In other example, the isolation barrier may be rated at 3 kv. In other examples, the isolation rating may be higher or lower than this, depending on the design of the isolation transformer.

Circuitry 732 is mounted on a die attach pad on a lead frame that overlaps secondary coil 712 and is coupled to secondary coil 712 as described in more detail herein above. A portion of the lead frame overlaps a portion of secondary coil 712. A thermal conductive path is established that allows conduction of heat from secondary coil 712 directly into the lead frame without needing to travel through a length of laminate substrate of transformer 702. Circuitry 731 is mounted on a separate lead frame and is coupled to primary coil 711.

Laminate transformer 711, circuitry 731, 732 and the associated lead frames are all encapsulated together with a mold compound using a known or a later developed molding technique to form a packaged isolation device.

Other Embodiments

In described examples, a single isolation device is illustrated on a PCB, such as PCB 206, (FIG. 3C). In other examples, several isolation devices may be mounted on a single PCB to provide galvanic isolation to several signals that must communicate across an isolation barrier.

In described examples, a portion of the lead frame is connected to and overlaps the secondary transformer coil. In another example, the configuration may be reversed such that a portion of the lead frame is connected to and overlaps a portion of the primary transformer coil.

In described examples, the magnetic core elements are ferrite. The ferrite is made from fine particles of ferromagnetic material that may include, iron and its various alloys with materials such as nickel, cobalt, tungsten, aluminum, etc. In another example, the magnetic core elements may be made from powdered iron or other known or later developed magnetic materials that have a permeability that improves inductance density and magnetic coupling between the coils of a laminate transformer.

In this example, the magnetic core elements are separate elements that are mounted on the laminate substrate by a pick and place operation using a robotic pick and place machine. In another example, the magnetic core elements may be fabricated using an additive manufacturing process, such as screen printing, 3D printing, etc. directly onto the laminate substrate. In another example, other known or later developed fabrication techniques may be used to fabricate the magnetic core elements on the laminate substrate.

In described examples, magnetic core elements are illustrated as having a rectangular footprint on the surface of the laminate substrate. In another example, the core elements may have other footprints, such as round or rounded, octagonal, hexagonal, etc. The adjacent lead frame may be contoured to accommodate the contour of the magnetic element.

In described examples, the coils are illustrated as being octagonal. In another example, the coils may have a different spiral shape, such a circular, hexagonal, square, rectangular, etc.

In described examples, the lead frames made from copper. In another example, the lead frames may be fabricated from another electrically conductive material, such as aluminum, etc.

In described examples, layers of the laminate substrate are laminate materials that include bismaleimide triazine (BT) and that have a high breakdown strength of 100-120 V/um. Such material may be obtained from Mitsubishi Gas Chemical (MGC) as copper clad laminates and pre-pregs, for example. However, in other examples, different types of laminate material may be used, such as ABF (Ajinomoto Buildup Films) material.

In described examples, the separate circuit ICs are coupled to the lead frame leads using a wire bonding technique. In another example, other types of known or later developed techniques may be used to couple the ICs to the lead frame and/or transformer coils.

In described examples, separate left and right lead frame elements are illustrated. However, during fabrication, a large sheet or strip of lead frames is fabricated using etching, stamping or other known or later developed techniques. Multiple laminate transformers are then positioned on the lead frame sheet/strip using a pick and place machine and attached with laminate attach adhesive. The circuit IC die are also positioned ono the lead frame sheet/strip using a pick and place machine and attached with die attach adhesive. After a wire bonding process, the entire lead frame sheet/strip is then molded to form multiple isolation devices. The lead frame sheet/strip is then cut apart to separate the isolation devices.

In this description, the term "couple" and derivatives thereof mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Modifications are possible in the described embodiments, and other embodiments are possible, within the scope of the claims.

What is claimed is:

1. An apparatus comprising:

a laminate substrate, the substrate having a first surface and an opposite second surface;

a laminate transformer within the laminate substrate between the first surface and the second surface, the transformer having a first coil and a second coil;

a magnetic core element on the first surface overlapping at least a portion of at least one of the first coil or the second coil;

a first lead frame on and overlapping at least partially with the first surface and spaced apart from the magnetic core element, in which the first lead frame is operable to transmit or receive a first voltage, the first lead frame includes a first portion and first leads, at least some of the first leads extends from a first side of the first portion, and a second side of the first portion opposing the first side of the first portion overlaps partially with the first coil; and a second lead frame on and overlapping at least partially with the first surface and spaced apart from the magnetic core element, in which the second lead frame is operable to transmit or receive a second voltage larger than the first voltage, the second lead frame includes a second portion and second leads extending from a first side of the second portion, and a second side of the second portion opposing the first side of the second portion is outside a footprint of the second coil, and a spacing between the second lead frame and the second coil is based on the second voltage.

2. The apparatus of claim 1, wherein the first coil has a width and wherein the first portion overlaps at least 1% of the width of the first coil.

3. The apparatus of claim 1, wherein the first coil has a width and wherein the first portion overlaps at least 20% of the width of the first coil.

4. The apparatus of claim 1, wherein the magnetic core element is a first magnetic core element, further comprising a second magnetic core element on the second surface overlapping at least a portion of at least one of the first coil or the second coil.

5. The apparatus of claim 1, wherein the laminate substrate has a hole extending from the first surface to the second surface, further comprising a center magnetic core element within the hole.

6. The apparatus of claim 1, wherein the laminate substrate has multiple laminate layers; and wherein the first coil is positioned on one or more of the multiple laminate layers.

7. The apparatus of claim 1, wherein the magnetic core element is a magnetic material.

8. The apparatus of claim 1, wherein the magnetic core element is a ferrite material.

9. The apparatus of claim 1, wherein the second portion is laterally spaced from the first coil by a distance to provide a specified dielectric isolation between the second lead frame and the first coil.

10. The apparatus of claim 1, wherein the first lead frame is configured to conduct heat away from the first coil via the first portion to at least some of the first leads.

11. The apparatus of claim 1, wherein the transformer is configured to transmit power between the first leads and the second leads.

12. The apparatus of claim 1, wherein each of the first and second coils includes a spiral shape.

13. An apparatus comprising:

a laminate substrate, the substrate having a first surface and an opposite second surface;

a laminate transformer within the laminate substrate between the first surface and the second surface, the transformer having a first coil and a second coil;

a magnetic core element on the first surface overlapping at least a portion of the first coil;

a first lead frame on and overlapping at least partially with the first surface and spaced apart from the magnetic core element, the first lead frame operable in a first voltage domain, the first lead frame including a first portion and first leads extending from a side of the first portion, and the first portion overlapping partially with the first coil;

a second lead frame on and overlapping at least partially with the first surface, the second lead frame operable in a second voltage domain higher than the first voltage domain, the second lead frame including a second portion and second leads extending from a side of the second portion, the second portion being outside a footprint of the second coil, and a spacing between the second lead frame and the second coil is based on the second voltage domain; and mold material encapsulating the laminate substrate, magnetic core element, a portion of the first lead frame, and a portion of the second lead frame.

14. The apparatus of claim 13, wherein the first coil has a width and wherein the first portion overlaps at least 1% of the width of the first coil.

15. The apparatus of claim 13, wherein the first coil has a width and wherein the first portion overlaps at least 20% of the width of the first coil.

16. The apparatus of claim 13, wherein the magnetic core element is a first magnetic core element, further comprising a second magnetic core element on the second surface overlapping at least of a portion of at least one of the first coil or the second coil.

17. The apparatus of claim 13, wherein the laminate substrate has a hole extending from the first surface to the second surface, further comprising a center magnetic core element within the hole.

18. The apparatus of claim 13, wherein the laminate substrate has multiple laminate layers; and wherein the first coil is positioned on one or more of the multiple laminate layers.

19. The apparatus of claim 13, wherein the magnetic core element is a ferrite material.

20. The apparatus of claim 13, wherein the first lead frame is configured to conduct heat away from the first coil via the first portion to at least some of the first leads.

* * * * *